United States Patent [19]

Bellanger et al.

[11] Patent Number: 4,907,653

[45] Date of Patent: Mar. 13, 1990

[54] IMPLEMENT CONTROL SYSTEM

[75] Inventors: Regis Bellanger, Beauvias, France; William J. Graaskamp, Guelph, Canada

[73] Assignee: Massey-Ferguson Services N.V., Curacao, Netherlands Antilles

[21] Appl. No.: 36,937

[22] Filed: Apr. 10, 1987

[30] Foreign Application Priority Data

Apr. 10, 1986 [GB] United Kingdom ................. 8608760

[51] Int. Cl.$^4$ .......................................... A01B 63/112
[52] U.S. Cl. ...................................... 172/10; 307/359
[58] Field of Search ................. 172/7, 9, 10; 307/526, 307/528, 358, 359; 318/624, 628, 646

[56] References Cited

U.S. PATENT DOCUMENTS

| 4,064,945 | 12/1977 | Haney | 172/10 |
| 4,194,574 | 3/1980 | Benson et al. | 172/7 |
| 4,300,638 | 11/1981 | Katayama et al. | 172/7 |
| 4,679,633 | 7/1987 | Kauss | 172/7 |

FOREIGN PATENT DOCUMENTS

| 3017569 | 11/1981 | Fed. Rep. of Germany | 172/7 |
| 3240278 | 5/1984 | Fed. Rep. of Germany | 172/7 |
| 3342006 | 5/1985 | Fed. Rep. of Germany | 172/7 |

OTHER PUBLICATIONS

English Translation of KochendorFer et al., (3,342,006 Germany).
English Translation of Vlemmings et al., (3,017,567 Germany).

Primary Examiner—Charles T. Jordan
Assistant Examiner—Stephen Johnson
Attorney, Agent, or Firm—Robert L. Farris

[57] ABSTRACT

A tractor implement draft force control system in which desired and actual implement draft force values are compared to provide a draft force error signal. The system is responsive to the error signal to control the working depth and hence the draft force of the implement. A deadband operates on the error signal to render error signals within the deadband ineffective to control the working depth of the implement and a deadband control means adjusts the width of the deadband so that the deadband width is maintained dependent on components of the error signal above a predetermined frequency. Thus the system can be arranged not to respond to high frequency spurious components of the draft force signal but is able to respond to the lower frequency components of this signal which are representative of the true draft force variations.

10 Claims, 3 Drawing Sheets

IMPLEMENT CONTROL SYSTEM

This invention relates to systems for Controlling the level of draft force experience by an implement drawn by a tractor. Many such systems have been proposed in the past and although many of these proposals have proved adequate for certain implements or certain ground conditions difficulty is experienced in providing a system which can be used with a wide variety of implements and ground conditions without requiring careful adjustment by a skilled operator.

It is an object of the present invention to provide an improved form of implement draft force control system which mitigates the above difficulty.

Thus according to the present invention there is provided a tractor implement draft force control system comprising:

means for setting a desired value of implement draft force, means for sensing the actual value of implement draft force, comparator means for comparing the desired and actual values of implement draft force to provide a draft force error signal, control means responsive to the error signal to control the working depth and hence the draft force of the implement, and deadband means operating on the error signal to render error signals within the deadband ineffective to control the working depth of the implement, the system being characterised in that deadband control means are provided to adjust the width of the deadband so that the deadband width is maintained dependent on components of the error signal above a predetermined frequency.

If one considers for example, the draft force signal generated by a typical moldboard plough it will be observed that this comprises a high frequency component whose fluctuations have a short duration of less than say 0.1 seconds, this high frequency component being imposed on a lower frequency component with fluctuations having a duration of say 2 seconds or more. The high frequency component of the signal can be regarded as spurious since it is not representative of the changes in operating condition of the implement but results from such factors as vibrations of the implement and associated linkage and brake down of the soil as the implement passes therethrough. It is the lower frequency component of the signal which provides a representative signal and to which the control system must respond.

Thus in the present invention by arranging that the width of the deadband is maintained such that the system will not attempt to respond to the high frequency fluctuations but will respond to the longer term lower frequency true draft force signals an efficient and stable control is obtained.

In a preferred arrangement the deadband control means provides a signal proportional to the peak to peak value of those components of the error signal above the predetermined frequency and this peak to peak signal is used as the basis for determining the deadband width.

Conveniently the draft error signal is fed through a high pass filter to filter off those components of the error signal above the predetermined frequency and the peak to peak signal is then generated from this filtered high frequency signal. Typically the predetermined frequency for the high pass filter will be say 3 Hz.

It has been found that a deadband width of 1.5 times the peak to peak signal is appropriate to provide a good stable control.

The deadband width set by the system is preferably subject to an overall control so that the deadband width cannot go below a minimum value nor above a maximum value. Typically the minimum deadband width is say 0.8% of the draft force control range and the maximum deadband width is say 6.0% of this range.

The present invention also provides a tractor draft force control system in which at draft forces above a predetermined level the increase in draft force signal per unit increase in draft force is reduced.

Typically in the upper one third of the draft force range (say from 4 to 6 tons) the increase in draft force is only one half of the rate of increase in the lower two thirds of the draft force range (i.e. below 4 tons).

One embodiment of the present invention will now be described, by way of example only, with reference to the accompanying drawings in which.

Figure 1:
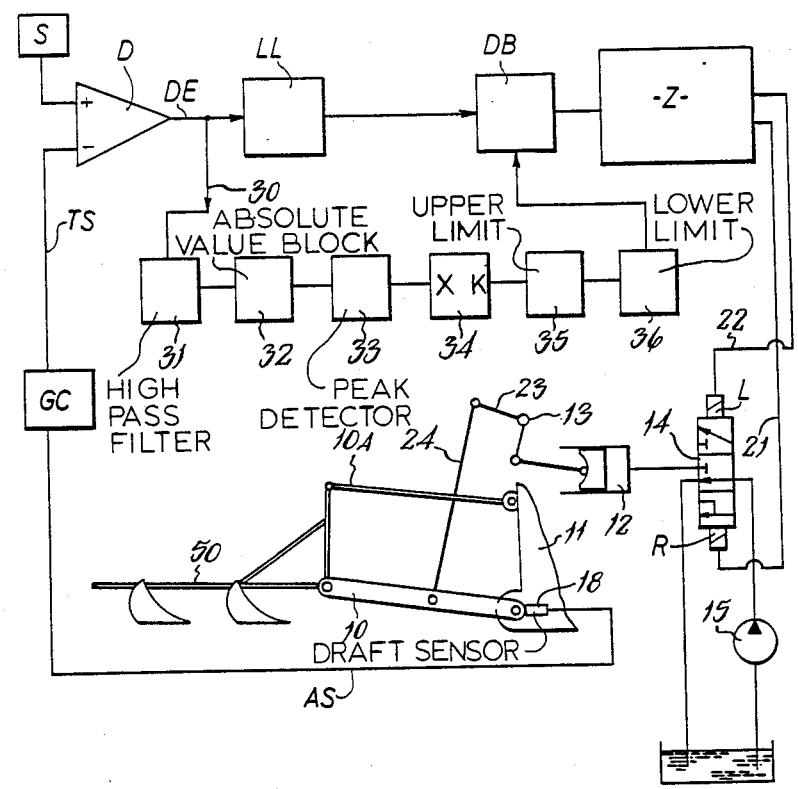
FIG. 1 is a diagrammatic representation of a control system embodying the present invention and the associated hydraulic valve components necessary to control a tractor implement hitch.

Referring to FIG. 1 a tractor hitch comprises a pair of draft links 10 (only one of which is shown in FIG. 1) and a top link 10A which are pivoted on to the rear of a tractor main housing 11. The hitch supports a soil engaging implement which in the example chosen is a moldboard plough 50. The position of the draft links 10 relative to the housing 11 is controlled by a hydraulic ram 12 which is connected with the draft links 10 via a conventional rotatable cross-shaft 13 which carries a pair of lift arms 23 and lift rods 24.

The supply of pressurised hydraulic fluid to the ram 12 and the venting of hydraulic fluid from the ram is effected by a solenoid operated spool valve 14 which is supplied with pressurised fluid by a pump 15 and which vents fluid to reservoir 16.

The valve 14 is controlled by a draft force control system in accordance with the present invention which includes a draft force setting means S which may conveniently comprise a rotary potentiometer of the form shown in FIG. 5 and referred to in greater detail below. This set value of draft force is fed to one input of a draft force comparator D. The other input of comparator D is fed with the actual draft force imposed on the draft links 10 by the plough 50 which is measured by a draft force sensor 18 and is relayed to comparator D via a gain control device GC referred to in more detail below. It will be appreciated that the draft force sensor 18 may be of any suitable type which is capable of providing an electrical signal proportional to the draft force imposed on the draft links.

The output of comparator D is a draft force error signal which is fed to the remainder of the control system indicated in FIG. 1 by the box Z via a lead/lag network LL and a deadband function DB.

The remainder of the control system which is represented by the box Z in FIG. 1 may be of any suitable form which can process the error signal emerging from deadband function DB and produce control signals to power the raise solenoid R and the lower solenoid L of valve 14 via line 21 and 22 respectively. An example of a suitable form of control system for controlling the solenoids R and L is disclosed in the Applicant's co-pending UK Patent Application number 8608194. Since the constructional details of the remainder of the control system do not constitute part of the present invention no further description will be given in the present application. It will be appreciated that the control system Z simply interprets the error signal leaving deadband function DB and produces a signal to power either the raise solenoid R or the lower solenoid L as is appropriate depending on the sign of the error signal.

The lead lag network LL is used in a known manner to speed up the response of the system and reduce hunting and the deadband function DB is used in the known manner to define a band of error signals which are ineffective to produce any control signals for the valve 14 thus preventing the system from being over sensitive.

In accordance with the present invention the draft force control system also includes a deadband control means which is represented diagrammatically in FIG. 1 by the control loop 30. This loop includes a high pass filter 31, an absolute value block 32, a peak detector 33, an arithmetic block 34 in which the signal may be multiplied by a constant, an upper limit control 35, and a lower limit control 36. The object of the control loop 30 is to produce a signal for varying the deadband applied by the deadband function DB so that the deadband width is made dependent on the high frequency components of the error signal emerging from the comparator D.

Figure 2:
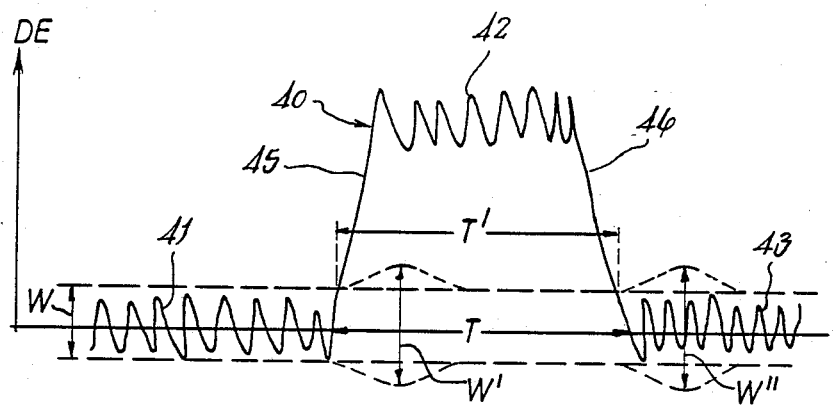
FIG. 2 shows the general form of the draft force signal from a moldboard plough and its relationship with the system deadband.

For example, a typical variation with time of the draft force error signal DE emerging from comparator D is shown by curve 40 n FIG. 2. This curve has a high frequency component shown by the portions 41, 42 and 43 of the curve in which the draft force signal fluctuations are of relatively short duration (i.e. less than 0.1 seconds) and a lower frequency component represented in the difference in the average levels of sections 41 42 and 43 of curve 40. It will be observed that the duration of the fluctuations of the lower frequency components is significantly longer and is represented by, for example, the time period T in the FIG. 2 which represents the time during which the draft force signal is at the generally higher level indicated by portion 42 of the curve. Typically the duration of the fluctuations of the low frequency component will be 1 or more seconds. As explained above it is the low frequency component of the draft force signal to which the system must attempt to respond.

Figure 3:
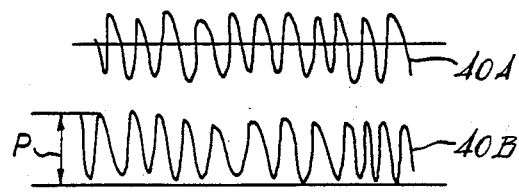
FIG. 3 shows two stages in the processing of the error signal in accordance with the invention.

Thus in accordance with the present invention the error signal DE leaving comparator D is fed around loop 30 where the error signal is first passed through the high pass filter 31 which filters out the lower frequency components of the signal leaving a signal of the form shown at 40A in FIG. 3. In a typical example the filter 31 operates at a cut-off frequency of 3 Hz so that only those components of the signal whose frequencies are above 3 Hz will be further processed by loop 30. After passing through filter 31 the signal then passes through the absolute value block 32 which rectifies the signal to produce an all positive signal as shown at 40B in FIG. 3.

The signal then passes through the peak detector 33 whose output is proportional to the peak to peak value of the signal 40B as indicated at P in FIG. 3. The signal emerging from the peak detector 33 is then passed through the arithmetic block 34 which, in the particular example described, multiplies the signal by a constant which is greater than unity in order to ensure that the deadband applied by the deadband function DB is always slightly larger than the peak to peak value of the high frequency component of the draft error signal. Typically it has been found that a multiplication factor of 1.5 produces a stable control arrangement.

The signal is then passed through the upper limit control 35 and the lower limit control 36 which ensure that the signal cannot be larger than an upper predetermined limit nor lower than a lower predetermined limit thus defining the maximum and minimum deadband widths. Typically the minimum deadband width is say 0.8% of the designed maximum draft force load of the system (typically 6 tons) and the maximum deadband is say 6.0% of this maximum. Thus the loop 30 adjusts the width of the deadband applied by the deadband function DB to the slightly larger than the peak to peak value of the high frequency component of the draft error signal. Referring to FIG. 2 the deadband width is represented by the band W and it will be observed that it has the effect of ensuring that the draft control system does not attempt to follow the high frequency variations 41 and 43 but will simply respond to that portion of the curve outside the deadband which is represented by the time period T' in FIG. 2.

In practice it will be found that due to the sudden large increase represented by portion 45 of curve 40 and decrease represented by portion of 46 of curve 40 the width of the deadband will temporarily enlarge as indicated at W' and W" in FIG. 2. This does not effect the operation of the system which is described as above.

It will be appreciated from the above that the present invention thus provides a draft force control system in which the width of the deadband applied by deadband function DB is continually adjusted in accordance with the peak to peak value of the high frequency components of the draft force error signal. Thus the tractor operator is relieved of the onerous duty of having to adjust the sensitivity of the system to cater for different implements and varying ground conditions.

Figure 4:
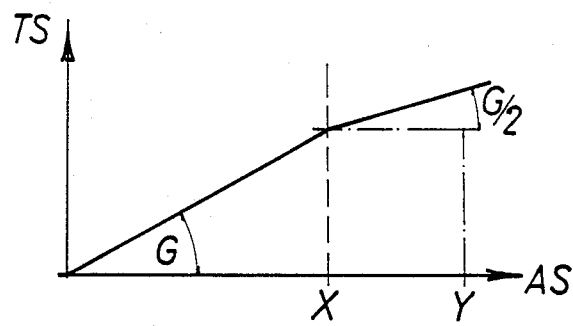
FIG. 4 shows the gain curve for the draft force signal.

The draft force control system includes another feature represented by the gain control device GC. The operation of this device is best illustrated by reference to FIG. 4 which shows the gain curve of device GC (i.e. the draft force transmitted signal TS plotted against the actual sensor signal AS). For lower draft force loads (that is say for loads up to point X in FIG. 4 which is say 4 tons which is two-thirds of the maximum design draft force load of say 6 tons) the gain of the draft force signal is represented as G in FIG. 4. In the higher draft force load region (that is for example in the top one-third of the design draft force range i.e. between points X and Y) the gain of the draft force signal is reduced. In the example chosen the gain G is divided by 2 in the higher region.

The gain of the draft force signal is controlled in the above manner in order to take account of the different behaviour of different implements. For example, smaller and lighter implements produce relatively small changes in draft force for a given change in working depth whereas heavier and deeper working implements produce much larger changes in draft force for the same change in working depth.

Figure 5:
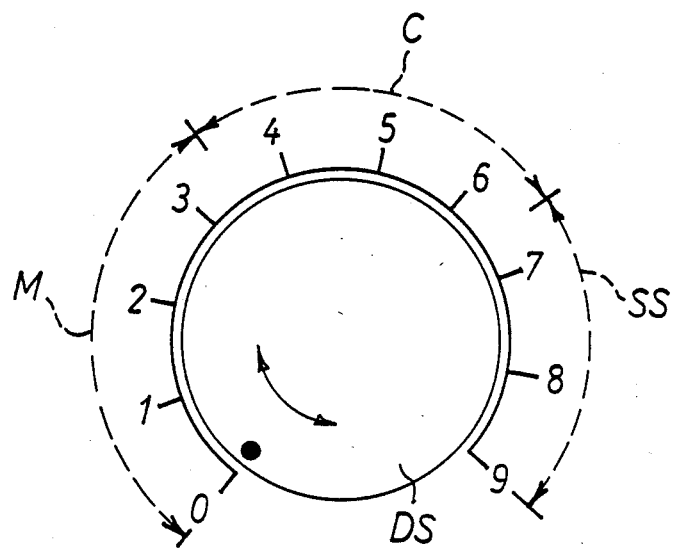
FIG. 5 is a diagrammatic representation of the control dial used to set the desired draft force.

A significant result of the above gain control arrangement is that the draft force setting dial DS shown in FIG. 5 has significantly more of its rotary movement allocated to the draft force range of implements such as moldboard ploughs (see the dial position M) and chisel ploughs (see dial position C) which require more accurate control by the operator and less of the dial allocated to larger implements such as subsoilers (see dial position SS) which are more stable in their operation. This is clearly an advantage to the operator since it makes the draft force setting dial less sensitive to adjustment in the operating range of moldboard and chisel ploughs.

It will be appreciated that the invention has been described above in relation to a so-called "bottom link sensing" type of draft force control system in which the forces applied to one or both of the bottom links of the tractor hitch by the implement are sensed and compared with the set draft force and that references above to "draft force" therefore refer to the force applied to the bottom link or links by the implement. The invention is, however, also applicable to the so-called "top link sensing" type of draft force control system in which the forces applied to the top link of the tractor hitch by the implement are sensed and compared with the set draft force. In such an application the references to "draft force" will be understood to refer to the force applied to the top link by the implement.

What is claimed is:

1. A tractor implement draft force control system comprising:
    means for setting a desired value of implement draft force,
    means for sensing the actual value of implement draft force,
    comparator means for comparing the desired and actual values of implement draft force to provide a draft force error signal,
    control means responsive to the error signal to control a working depth and hence the draft force of the implement,
    deadband means operating on the error signal to render error signals within the deadband ineffective to control the working depth of the implement, and
    deadband control means which process the error signal to determine those components of the error signal above a predetermined frequency and then adjust the width of the deadband in dependence on those components of the error signal above a predetermined frequency.

2. A control system according to claim 1 in which the deadband control means provides a signal proportional to the peak to peak value of those components of the error signal above the predetermined frequency, said peak to peak signal being used as a basis for determining the deadband width.

3. A control system according to claim 2 in which the deadband control means includes a high pass filter through which the draft error signal is fed to filter off those components of the error signal above the predetermined frequency, the resultant filtered high frequency signal is then used to generate the peak to peak signal.

4. A control system according to claim 3 in which the predetermined frequency for the high pass filter is substantially 3 Hz.

5. A control system according to claim 2 in which the deadband control means includes an arithmetic block which processes the peak to peak signal so that the deaband width is larger than the peak to peak signal.

6. A control system according to claim 5 in which that the arithmetic block processes the peak to peak signal so that the deadband width is approximately 1.5 times the peak to peak signal.

7. A control system according to claim 1 in which the deadband control means includes upper and lower limit controls which ensure that the deadband width cannot be below a minimum value nor above a maximum value.

8. A control system according to claim 7 characterised in that upper and lower limit controls set the minimum deadband width at 0.8% of a designed maximum draft force load of the system and the maximum deadband width at 6.0% of this maximum.

9. A control system according to claim 1 characterized in that a gain control means is provided to process the actual draft force signals so that at draft force signals above a predetermined level increase in draft force signal per unit increase in draft force is reduced.

10. A tractor implement draft force control system comprising:
    means for setting a desired value of implement draft force,
    means for sensing the actual value of implement draft force,
    comparator means for comparing the desired and actual values of implement draft forces to provide a draft force error signal,
    control means responsive to the error signal to control a working depth and hence the draft force of the implement, and
    gain control means to process the actual draft force signals so that at draft force signals above a predetermined level on increase in draft force signal per unit increase in draft force is automatically reduced.

* * * * *